United States Patent
Whitby-Strevens

(10) Patent No.: US 8,897,398 B2
(45) Date of Patent: Nov. 25, 2014

(54) METHODS AND APPARATUS FOR ERROR RATE ESTIMATION

(71) Applicant: Apple Inc., Cupertino, CA (US)

(72) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/747,383

(22) Filed: Jan. 22, 2013

(65) Prior Publication Data

US 2013/0195160 A1   Aug. 1, 2013

Related U.S. Application Data

(60) Provisional application No. 61/591,735, filed on Jan. 27, 2012.

(51) Int. Cl.
| | | |
|---|---|---|
| *H04B 3/46* | (2006.01) | |
| *H04B 17/00* | (2006.01) | |
| *H04Q 1/20* | (2006.01) | |
| *H04L 1/20* | (2006.01) | |
| *H04L 1/00* | (2006.01) | |

(52) U.S. Cl.
CPC *H04L 1/00* (2013.01); *H04L 1/203* (2013.01); *H04L 1/0007* (2013.01)
USPC .......................................................... 375/341

(58) Field of Classification Search
CPC .................................................. H04L 27/2662
See application file for complete search history.

(56) References Cited

U.S. PATENT DOCUMENTS

| 7,062,687 | B1 | 6/2006 | Gfeller et al. |
|---|---|---|---|
| 7,257,163 | B2 | 8/2007 | Hwang et al. |
| 7,639,687 | B1 | 12/2009 | Tsai et al. |
| 8,650,010 | B2 | 2/2014 | Raju et al. |
| 2002/0138721 | A1 | 9/2002 | Kwon et al. |
| 2003/0043141 | A1 | 3/2003 | Bae et al. |
| 2003/0048852 | A1 | 3/2003 | Hwang et al. |
| 2004/0103363 | A1 | 5/2004 | Kim et al. |
| 2004/0131025 | A1 | 7/2004 | Dohler et al. |

(Continued)

FOREIGN PATENT DOCUMENTS

| EP | 1940034 | 7/2008 |
|---|---|---|
| EP | 2490473 | 8/2012 |
| WO | 2011/044793 | 4/2011 |

OTHER PUBLICATIONS

Widmer, A. X., Franaszek, P. A., "A DC-Balanced, Partitioned-Block, 8B/1 OB Transmission Code", IBM J. Res. Develop, vol. 27, No. 5, Sep. 1983, pp. 440-451.

(Continued)

*Primary Examiner* — Erin File
(74) *Attorney, Agent, or Firm* — Gazdzinski & Associates, PC

(57) ABSTRACT

Methods and apparatus for estimating received error rates. In one embodiment, the estimation of received error rates is conducted in relation to a bus interface such as a high-speed High-Definition Multimedia Interface (HDMI) interface, and the method utilizes corrupted symbols that violate TMDS symbol rules, the corrupted symbols being easily detected and counted. In one exemplary implementation, a symbol error rate (SER) can be estimated from the number of detected invalid symbols. The SER can be used to diagnose the performance of the HDMI interface, and optionally as a basis for selecting or implementing corrective action(s).

23 Claims, 5 Drawing Sheets

(56) References Cited

U.S. PATENT DOCUMENTS

| | | |
|---|---|---|
| 2005/0012592 A1 | 1/2005 | Debelleix |
| 2005/0286643 A1 | 12/2005 | Ozawa et al. |
| 2007/0206642 A1 | 9/2007 | Egan et al. |
| 2007/0257923 A1 | 11/2007 | Whitby-Strevens |
| 2008/0095218 A1 | 4/2008 | Murray et al. |
| 2008/0180287 A1 | 7/2008 | Widmer |
| 2008/0204285 A1 | 8/2008 | Carter et al. |
| 2008/0235551 A1 | 9/2008 | Lin |
| 2008/0252497 A1 | 10/2008 | Widmer |
| 2008/0258945 A1 | 10/2008 | Widmer |
| 2009/0024756 A1 | 1/2009 | Spalla et al. |
| 2009/0147864 A1 | 6/2009 | Lida et al. |
| 2009/0185565 A1 | 7/2009 | Diab et al. |
| 2010/0057556 A1 | 3/2010 | Rousso et al. |
| 2010/0118795 A1* | 5/2010 | Hassan ............... 370/329 |
| 2012/0084559 A1* | 4/2012 | Bonicatto ............ 713/162 |
| 2012/0146989 A1 | 6/2012 | Whitby-Strevens |
| 2012/0163490 A1 | 6/2012 | Whitby-Strevens |

OTHER PUBLICATIONS

"IEEE Standard for a High-Performance Serial Bus", IEEE Computer Society, Oct. 21, 2008.

* cited by examiner

METHODS AND APPARATUS FOR ERROR RATE ESTIMATION

PRIORITY AND RELATED APPLICATIONS

This application claims priority to co-owned, co-pending U.S. Provisional Patent Application Ser. No. 61/591,735 filed Jan. 27, 2012 and entitled "METHODS AND APPARATUS FOR ERROR RATE ESTIMATION", the foregoing being incorporated herein by reference in its entirety.

This application is also related to co-owned, co-pending U.S. Provisional Patent Application Ser. Nos. 61/591,723 filed on Jan. 27, 2012 and entitled "METHODS AND APPARATUS FOR THE INTELLIGENT SCRAMBLING OF CONTROL SYMBOLS", and 61/711,656 filed Oct. 9, 2012 and entitled "METHODS AND APPARATUS FOR THE INTELLIGENT SCRAMBLING OF CONTROL SYMBOLS" and U.S. patent application Ser. No. 12/976,274 filed Dec. 22, 2010 and entitled "METHODS AND APPARATUS FOR THE INTELLIGENT ASSOCIATION OF CONTROL SYMBOLS", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of data networking and telecommunications. More particularly, in one exemplary aspect, the present disclosure is directed to estimating received error rates over e.g., a bus interface.

2. Description of Related Technology

High-Definition Multimedia Interface (HDMI) is an exemplary digital display interface standard for connecting multimedia data sources to multimedia display devices. Existing HDMI devices generally support video data, audio data, control data, and optionally network connections. Historically, HDMI was developed to improve audio visual (A/V) interface capabilities while still supporting legacy interfaces (e.g., Digital Visual Interface (DVI)). However, legacy signaling standards were designed around assumptions that are no longer accurate for many consumer electronics. Specifically, aggressive device form factors (e.g., those which are very spatially compact, contain metal casings or other components, etc.) may experience link reliability issues which were heretofore unknown.

For example, HDMI uses Transition Minimized Differential Signaling (TMDS) to reduce electromagnetic interference (EMI), and assist in accurate clock recovery. TMDS maps eight (8) bit data to ten (10) bit symbols. The mapping reduces the likelihood of overshooting or undershooting signaling transitions which can contribute to bit errors. Additionally, TMDS ensures that the data has regular transitions, which is required for clock-data recovery. The mapping scheme of TMDS is simple enough to be handled entirely in link layer hardware i.e., without the assistance of higher layer software.

Unfortunately, existing incarnations of HDMI do not have adequate mechanisms for diagnosing link quality during operation. For reasons discussed in greater detail subsequently herein, corrupted HDMI data is indistinguishable from normal HDMI data using conventional error detection techniques. For example, solutions for determining Bit Error Rate (BER) are based on counting the number of erroneous bits during transmission. Since HDMI receivers cannot detect bit errors, such receivers cannot implement traditional BER metrics.

Accordingly, improved methods and apparatus for detecting and/or characterizing connection quality are required for HDMI devices (and other non-HDMI technologies suffering similar deficiencies).

SUMMARY

The present disclosure satisfies the aforementioned needs by providing, inter alia, improved apparatus and methods for estimating received error rates, such as over a bus interface.

A method for estimating received error rates is disclosed. In one embodiment, the method includes: identifying a set of invalid symbols based on one or more operational modes; determining a likelihood of detecting an invalid symbol; detecting one of more received invalid symbols; and estimating a number of symbol errors, based at least in part on the detected one or more received invalid symbols and the determined likelihood.

In one variant, the received invalid symbol is detected based at least in part on a listing of valid symbols corresponding to a predetermined protocol format.

In other variants, the received invalid symbol is detected based at least in part on a comparison of the received symbol against one or more lists of valid symbols. In one such example, each operational mode of the one or more operational modes is associated with a respective list of valid symbols.

In one variant, the method further includes: counting a number of the detected one or more received invalid symbols, where the estimated number of symbol errors is further based at least in part on the counted number of detected one or more received invalid symbols.

In still other variants, the method includes counting a number of received valid symbols, where the estimated number of symbol errors is further based at least in part on the counted number of received valid symbols.

In yet another variant, the estimating received error rates is conducted relative to a high-speed bus interface.

An apparatus for estimating a rate of symbol errors is disclosed. In one embodiment, the apparatus includes: one or more interfaces, the one or more interfaces configured to receive data communication from an upstream device; and at least one controller in operative communication with the one or more interfaces, the at least one controller configured to: detect one or more invalid symbols received over the one or more interfaces; determine a probability of an occurrence of one or more undetectable invalid symbols; and estimate a number of symbol errors based at least on the detected one or more invalid symbols and the determined probability.

In one variant, the at least one controller is further configured to track the estimated number. In one exemplary implementation, the at least one controller is further configured to: detect when the upstream device in communication from the one or more interfaces has a change in operational status; and upon the detection, reset the tracked number to an initial counter value. In some cases, the detected change in operational status includes a disconnection of the upstream device from the one or more interfaces. Alternately, the detected change in operational status includes the entrance of the upstream device into a low power mode.

In a second variant, the at least one controller is further configured to track a number of valid symbols received over the one or more interfaces.

In a third variant, invalid symbols are detected based at least in part on a lack of compliance with a data format.

Various implementations may include at least one of the one or more interfaces that are compliant with a High-Definition Multimedia Interface (HDMI) standard.

A method of accounting for undesired errors over a data interface is disclosed. In one embodiment, the method includes: receiving one or more symbols during an operational mode selected from a plurality of operational modes; determining an invalidity of the received one or more symbols based at least in part on a set of rules associated with the selected operational mode; determining a likelihood of detecting an invalid symbol; and tracking an estimated number of total invalid symbols of the one or more symbols based at least in part on the determined invalid one or more symbols and the determined likelihood.

In one variant, the determining when the received one or more symbols are invalid is further based at least in part on verifying the received one or more symbols correspond to a current running disparity. In some cases, a symbol of the received one or more symbols is determined to be invalid when the symbol has a disparity mismatch with the current running disparity. In other cases, upon determining a symbol of the one or more symbols has a disparity mismatch with the current running disparity: the method includes: checking the symbol against a pool of all valid symbols for all disparities; and determining the symbol to be invalid when the symbol fails to match any of the valid symbols.

In another variant, the method includes instituting a corrective action upon the estimated number of invalid symbols exceeding an error threshold. In some variants, the corrective action includes at least indicating a transmission problem to a source device transmitting the one or more symbols.

Other features and advantages of the present disclosure will immediately be recognized by persons of ordinary skill in the art with reference to the attached drawings and detailed description of exemplary embodiments as given below.

All Figures © Copyright 2012-2013 Apple Inc. All rights reserved.

DETAILED DESCRIPTION

Reference is now made to the drawings, wherein like numerals refer to like parts throughout.
Overview In one embodiment of the present disclosure, an overall performance associated with a data link or interface is determined as an estimated number of symbol errors or symbol error rate (SER). In particular, while in certain types of data links or interfaces (such as those compliant with the aforementioned HDMI standard) it is virtually impossible to identify if a bit has been corrupted, certain types of bit corruptions will generate an invalid symbol which do not obey one or more protocol rules. Such invalid symbols can be detected even where the bit corruption is unknown.

Moreover, in another embodiment of the disclosure, since certain bit corruptions generate valid symbols, a scheme is disclosed to estimate the total number of symbol errors based on both the detected invalid symbols and a likelihood (e.g., probability) of detection.

While the estimated number of symbol errors produced under the aforementioned technique is not the same as a conventional bit error rate (BER) measurement, the number of symbol errors is none-the-less useful for, inter alia, diagnosing performance problems.
Detailed Description Of Exemplary Embodiments Exemplary embodiments of the present disclosure are now described in detail. While these embodiments are primarily discussed in the context of High-Definition Multimedia Interface (HDMI) link or interface operation, it will be recognized by those of ordinary skill given this disclosure that the present embodiments are not so limited. In fact, the various principles described herein are useful in and readily adapted to any data bus interface that can benefit from error rate estimation, as described herein.

Figure 1:
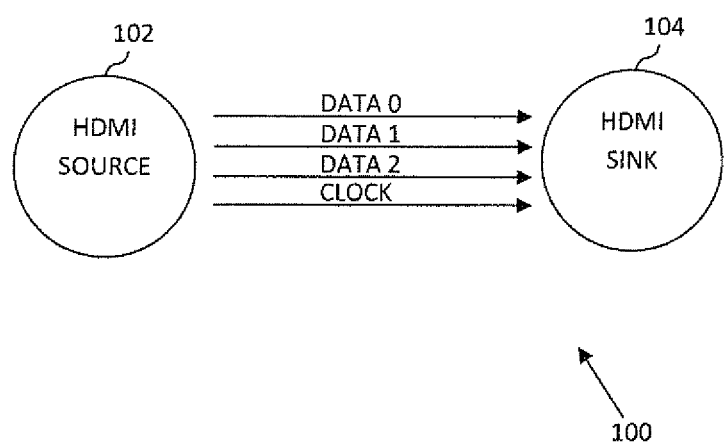
FIG. 1 is a graphical representation of one exemplary multimedia system, useful in conjunction with the present disclosure.

Referring now to FIG. 1, one exemplary multimedia system is illustrated. As shown the system 100 includes one or more multimedia sources 102, and one or more multimedia sinks 104. Common examples of multimedia sources include, without limitation, media players (e.g., Digital Video Disk (DVD) players, Blue-ray players, etc.), content delivery networks, audio/visual (A/V) equipment (e.g., camcorders, etc.), personal computers (PC), etc. Common examples of multimedia sinks include, without limitation, media displays, televisions, monitors, etc.

In one exemplary embodiment of the present disclosure, the multimedia system comprises a High-Definition Multimedia Interface (HDMI) compliant source and sink. The exemplary HDMI interface comprises four (4) differential signaling pairs that consist of: three (3) data channels (data channel 0, data channel 1, data channel 2), and a clock (characterized by a 1/10 bit-rate frequency). In other configurations (such as e.g., future implementations of HDMI), the clock differential pair may be replaced with another data channel. The differential signaling pairs are further configured for operation based on Transition Minimized Differential Signaling (TMDS) as previously described herein, and as is well known to the HDMI standard(s).

Figure 2:
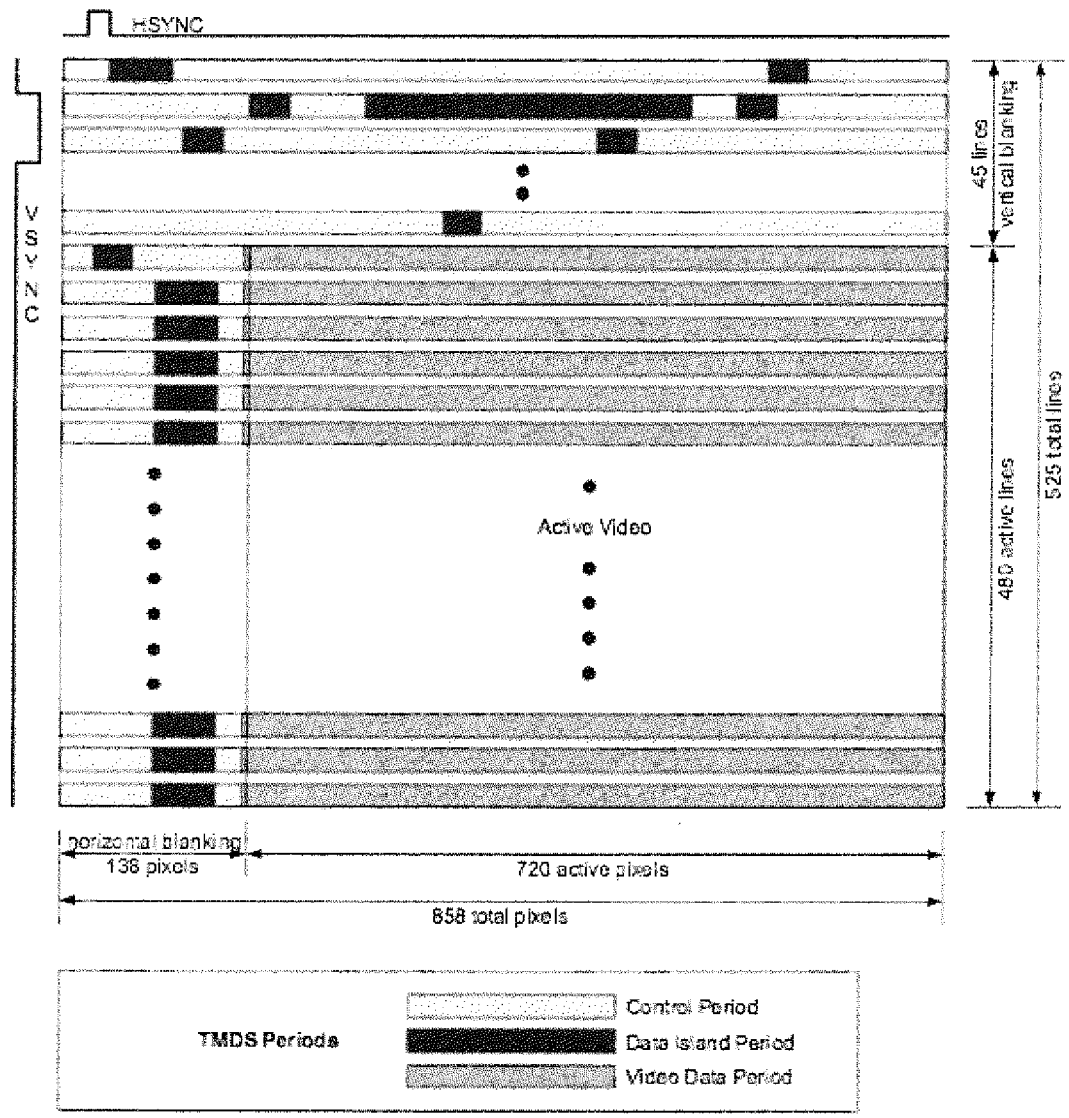
FIG. 2 is a graphical representation of the data traffic that constitutes a frame of 720×480 pixels of video data, useful in conjunction with the present disclosure.

FIG. 2 is a graphical representation of exemplary data traffic representing a frame of 720×480 pixels of video data. It should be noted that the foregoing resolution is merely illustrative of a common video frame size, those of ordinary skill in the related arts will appreciate that other video frame sizes may be substituted. As a brief aside, the current incarnation of HDMI specifies five (5) different types of information: (i) control information, (ii) preamble, (iii) guard band, (iv) data island data and (v) video data. As shown in FIG. 2, the first 45 scan, lines constitute the vertical blanking interval. Thereafter, the first 138 pixels of each scan line is a horizontal blanking interval, the remaining 720 pixels is video data. During both the horizontal and vertical blanking intervals, the data channels may transmit either control data or data islands. The preamble and guard band information are provided to facilitate identification of data islands and/or video data. A preamble immediately precedes data island periods and video data periods. Both video data periods and data island periods start with a guard band. Data island periods may also conclude with a guard band.

HDMI TMDS observes a fixed set of rules that enables only a subset of possible symbols, based on the type of data. Moreover, for simplicity, only 10-bit patterns are used to represent the information to be transmitted (i.e., the symbols do not change in length). Specifically, the 10-bit encodings used for control and preamble transmissions share common symbols which are disjoint from (i.e., do not overlap) the 10-bit symbols used for the other types of data (guard band, data island and video data). Similarly, the 10-bit symbol encodings used for data island transmissions (also referred to as TERC4 (TMDS Error Reduction Coding 4-bit) encoding) are distinct. The 10-bit symbols used for the guard band are a subset of the symbol encodings used for video data.

Unfortunately, it is not possible to detect every single-bit error that might occur in TMDS 10-bit symbols since the 10-bit encoding does not provide redundant information (unlike forward error correction (FEC) codes e.g., hamming codes, parity codes, Viterbi codes, turbo codes, etc.). Similarly, many other line codes (such as IBM 8B/10B) determine bit errors by examining a running disparity. A running disparity is a value that is based on a running count of ones (voltage high) and zeros (voltage low). For example, 8B/10B ensures that the difference between the number of ones transmitted and the number of zeros transmitted is bounded to no more than one (+1 or −1) at the end of each symbol. By keeping a very tight control on running disparity, 8B/10B can identify bit errors immediately (if the running disparity is different between the transmitter and receiver, then a bit error has occurred). Unfortunately, with TMDS encoding, the running disparity can be up to a difference of ten (10); thus, many single-bit errors can occur without detection in TMDS.

Moreover, if a 10-bit symbol has a single corrupted bit, the de-mapped 8-bit data may have different levels of corruption (i.e., a single-bit error in the symbol may map into multiple bit errors in the data). Since the de-mapping of 10-bit symbols to 8-bit data is being performed transparently to higher layer software, higher layer correction schemes cannot resolve this deficiency. For these reasons, conventional bit error rate (BER) analysis performed on a TMDS receiver is an inaccurate metric for overall link performance.

Accordingly, in one exemplary implementation, the overall link performance is measured as a number of symbol errors or symbol error rate (SER), not a bit error rate (BER). Specifically, while conventional BER is a useful software metric, BER may not address underlying physical link issues for TMDS based receivers. More generally, SER can be a useful predictor of link performance, for systems that perform digital manipulations (e.g., de-mapping) on uncorrected symbols.

As previously stated, it is not possible to detect every single-bit error that may occur in a TMDS 10-bit symbol, however corrupted symbols that violate TMDS symbol rules can be easily detected and counted. Thus, a number of symbol errors or symbol error rate (SER) can be estimated from the number of detected invalid symbols, and a set of assumptions that are true under normal operation. Specifically, during normal operation, single-bit errors occur at bit value transitions due to accumulated Inter-Symbol Interference (ISI) (based on the previous run length) and random jitter. Accordingly, bit errors are assumed to be randomly evenly distributed (i.e., each bit of the 10-bit symbol has an equal probability of corruption) and very sparse.

Based on the foregoing assumptions, numerical analysis by the Assignee hereof indicates that during video data periods, about 76% of single-bit errors will convert a valid TMDS 10-bit symbol into an invalid 10-bit symbol (which can be detected). In the remaining 24% of the cases, a single-bit error will convert a valid TMDS 10-bit symbol into a different, but still valid, TMDS 10-bit symbol (i.e., undetectable).

Accordingly, in one exemplary implementation, a detected number of invalid symbol errors are used to estimate a total number of symbol errors; specifically, the number of invalid symbols received can be counted and multiplied by a ratio determined from the number of valid-valid corruptions and valid-invalid corruptions. More generally, the total number of symbol errors can be estimated based on the number of received invalid symbols and the probability of detection of a symbol error.

These schemes for estimating symbol errors can be utilized to, inter alfa, greatly improve multiple aspects of receiver operation. For example, symbol error rates (SER) for HDMI transceivers can be used to perform jitter tolerance testing at the receiver by applying a stressed signal at the receiver and measuring the SER. SER information can identify interoperability issues caused by signal integrity failures (resulting in high SER), or higher level protocol failures (by verifying that SER is low), or take even yet other corrective/remedial actions (including acting as an input to a higher-level logical process or algorithm to automatically diagnose/correct issues).

Moreover, by providing accurate representation of link quality, a source device can intelligently adapt the display resolution (or other data payloads) for the link capabilities (e.g., reduce payload size during high SER), or notify the user of channel-related issues (e.g. poor cable performance). SER can also be used to calibrate receiver components such as internal adaptive equalizers (the equalizer can determine an appropriate equalization value without under-equalization and over-equalization). Still other uses for SER include without limitation, statistical performance, modeling and design feedback, and manufacturing testing.

Methods—

Figure 3:
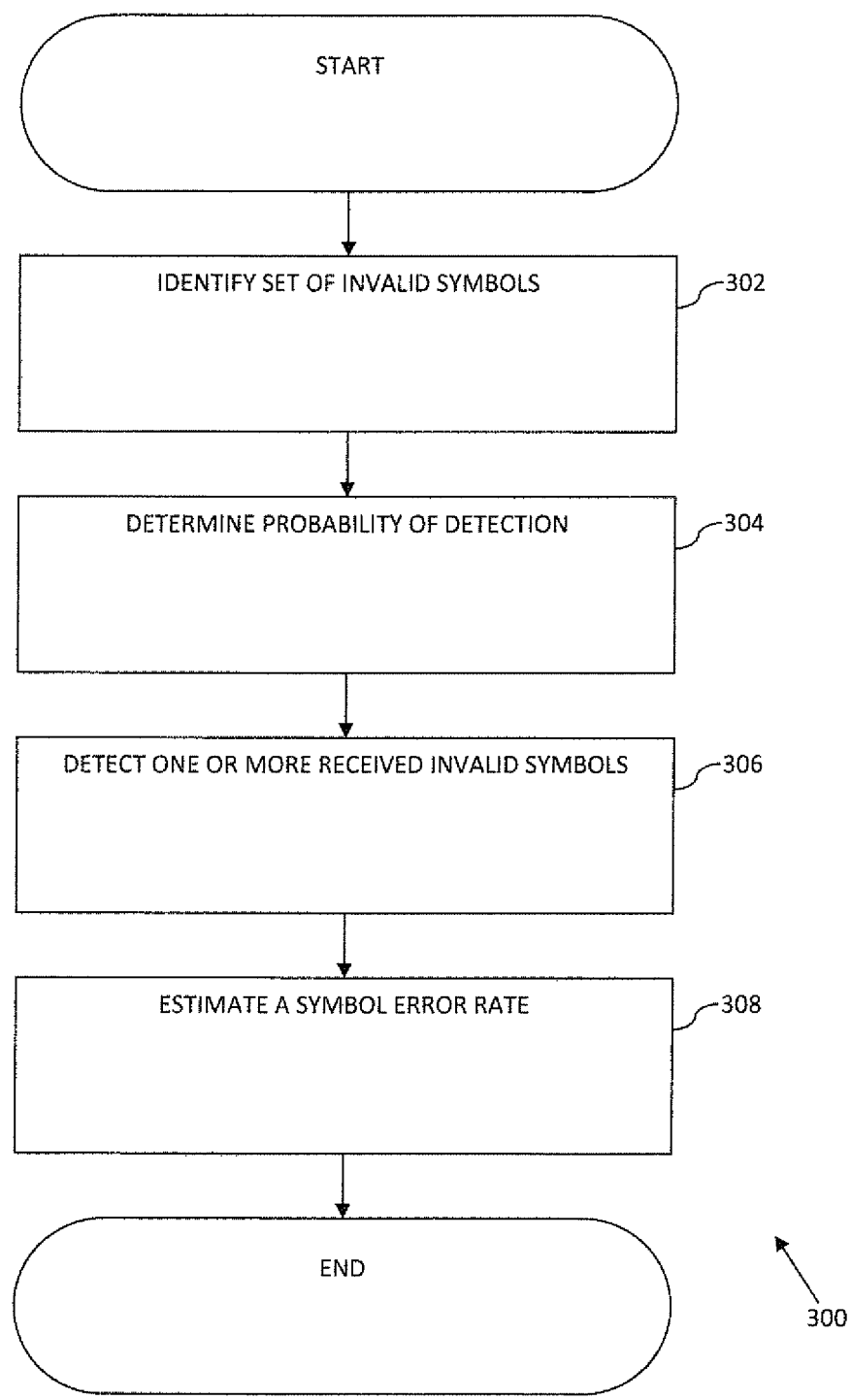
FIG. 3 is a logical flow diagram illustrating one embodiment of a generalized method for estimating received error rates over a high-speed bus interface, according to the present disclosure.

FIG. 3 illustrates one embodiment of a generalized method 300 for estimating received error rates over a high-speed bus interface.

At step 302 of the method 302, a set of invalid (or alternately valid) symbols are identified. As used herein, the terms "invalid" and "invalidity" refer to data structures which do not conform to a predetermined format. Conversely, as used herein, the terms "valid" and "validity" refer to data structures which conform to a predetermined format. Finally, as used herein, the term "indeterminate" refers to a data structure which has not been evaluated for conformance to a predetermined format, or alternately to a data structure which has no predetermined format. For example, in one exemplary embodiment, a list of valid symbols is maintained for each receiver operational mode (or context). If the received symbol is in the list, then it is valid. If it is not in the list, then it is invalid. While this scheme presents a "valid set" and an "invalid set", it is appreciated that other schemes may incorporate "indeterminate" sets (i.e., symbols which are not considered valid or invalid).

In one exemplary embodiment of the method, a set of invalid symbols (or alternatively valid symbols) are identified based on a data format. For example in one implementation, a High-Definition Multimedia Interface (HDMI) transmission is composed of several known periods; i.e., vertical blanking periods, horizontal blanking periods, and video data periods. Within each of these periods, there are only certain types of data which can be transmitted, these include: (i) control information, (ii) preamble, (iii) guard band, (iv) data island data and (v) video data.

Within this context, each type of data may further implement certain rules. Common examples of rules include, without limitation: (i) a limited subset of data patterns (e.g., out of 1024 possible patterns only 256 patterns are valid, etc.); (ii) a number of data transitions (e.g., a fixed number of transitions, a running disparity, etc.); (iii) a minimum or maximum number of transitions (e.g., a maximum run length, etc.); (iv) the presence or absence of a symbol (e.g., a missing or double counted boundary symbol, etc.), etc.

Common examples of data formats which are associated with multimedia applications include, without limitation, audio codec data, video codec data, formatted text data, streaming data formats, compression formats, etc. Yet other data formats which are more generically used within the related arts include: packetized data, frame data, slotted data, data blocks, etc.

In yet another embodiment, a set of invalid symbols (or alternatively valid symbols) is identified based on a receiver operational mode. For example, certain line codes limit a maximum "run length" in data by using only a subset of available patterns. One such example is Transition Minimized Differential Signaling (TMDS) that maps 8-bit data to 10-bit symbols (i.e., $2^8$ (256) possible data patterns are mapped to symbols that have $2^{10}$ (1024) possible patterns; only one fourth (256/1024) of the total set of 10-bit symbols are utilized at any one time). Other examples of line codes include for example, 4B3T, Eight To Fourteen Modulation (EFM), 4B/5B, 6B/8B, 8B/10B, 64B/66B, 128B/130B, etc.

Still other examples of receiver operational modes useful with the present disclosure include without limitation: power modes, speed modes, host/slave modes, etc. For instance, certain transceivers may support varying degrees of low power/sleep modes which only allow a certain amount of data (e.g., reduced data rates), or a certain type of data transmissions (e.g., wake-up signaling, so-called "heart beat" signaling, etc.). In another example, transceivers that support high and low speed modes may implement different types of data coding (e.g., line coding, etc.) or protocol (e.g., arbitration, acknowledgment, etc.) according to speed. Still other transceivers may support different protocols based on transceiver host mode, slave mode, peer to peer mode, network mode, etc.

Those of ordinary skill will readily recognize, given the present disclosure, that a wide variety of different schemes can be used in the transceiver arts to identify a set of invalid (or alternatively valid) symbols based on one or more protocol rules.

At step 304 of the method 300, a likelihood metric (e.g., probability) of detecting an invalid (or alternatively valid) symbol is determined. In one exemplary embodiment, the likelihood metric is a probability of detection that is based on a numerical analysis of the invalid and valid sets. For example, in one exemplary TMDS embodiment, about 76% of single-bit errors will convert a valid TMDS 10-bit symbol into an invalid 10-bit symbol; otherwise, a single-bit error will convert a valid TMDS 10-bit symbol into a different, but still valid, TMDS 10-bit symbol. In this example, the ratio between valid-valid corruptions (where symbol errors are not detected) to valid-invalid corruptions (where symbol errors can be detected), can be used to estimate the total symbol errors. Approximately three (3) out of four (4) symbols is invalid and can be detected, thus the detected invalid symbol errors can be modified by 133% to yield an estimate of the actual number of symbol errors.

In other embodiments, the probability of detection may consider other factors such as the sample size (for small sample sizes, the error rate may be misrepresent actual performance), various bits being more or less likely for corruption (weighted bit corruptions can skew the probability valid-valid and valid-invalid corruptions), etc.

At step 306 of the method 300, the receiver detects one of more received invalid (or alternately valid) symbols. In one exemplary embodiment, during normal operation, the receiver performs an incrementing count of the number of symbols received which are invalid. Alternately, the receiver may count valid symbols; for example, in embodiments where symbols are infrequently sent, a valid symbol count may be more informative than an invalid symbol count.

In one variant, the count is performed over a fixed time interval. Fixed time intervals may be useful for normalized comparisons (e.g., historical analysis, etc.), and for a determination of symbol error rate (SER).

In another variant, the count is performed until reset; so called "running" counts are useful for a wide range of diagnostics (e.g., especially over very long tests).

In still another variant, the count is enabled or disabled according to a trigger event; triggering events are well understood within the diagnostic arts, and are generally used to focus diagnostic effort on a particular event of interest. Common trigger events include for example: software execution, specific transactions, enabling and disabling of hardware, a specific data pattern, etc.

At step 308, the receiver determines an estimated number of symbol errors. In one exemplary embodiment, the estimated number of symbol errors is based on the detected symbol errors and the determined probability of detection. Various embodiments may additionally enable various reporting mechanisms e.g., query, poll, triggered reports, etc.

Example Operation—

As previously stated, High-Definition Multimedia Interface (HDMI) Transition Minimized Differential Signaling (TMDS) cannot accurately determine a bit error rate (BER). However, within the context of HDMI TMDS, the protocol obeys a set of rules which limit the types of symbols which can be used during certain receiver operations. In one exemplary embodiment, the rules for HDMI TMDS include:
  (i) during control periods, the only valid symbols are control symbols and preamble symbols;
  (ii) during preamble reception, the only valid symbols are preamble symbols and guard band symbols;
  (iii) during guard band reception, the only valid symbols are guard band symbols and video data and data island data;
  (iv) during reception of data island data, the only valid symbols are data island data, guard band symbols, and control symbols; and
  (v) during reception of video data, the only valid symbols are video data and control symbols.

Received symbols that do not obey the foregoing rules can be detected, even where the exact nature of the corruption is unknown.

Figure 4:
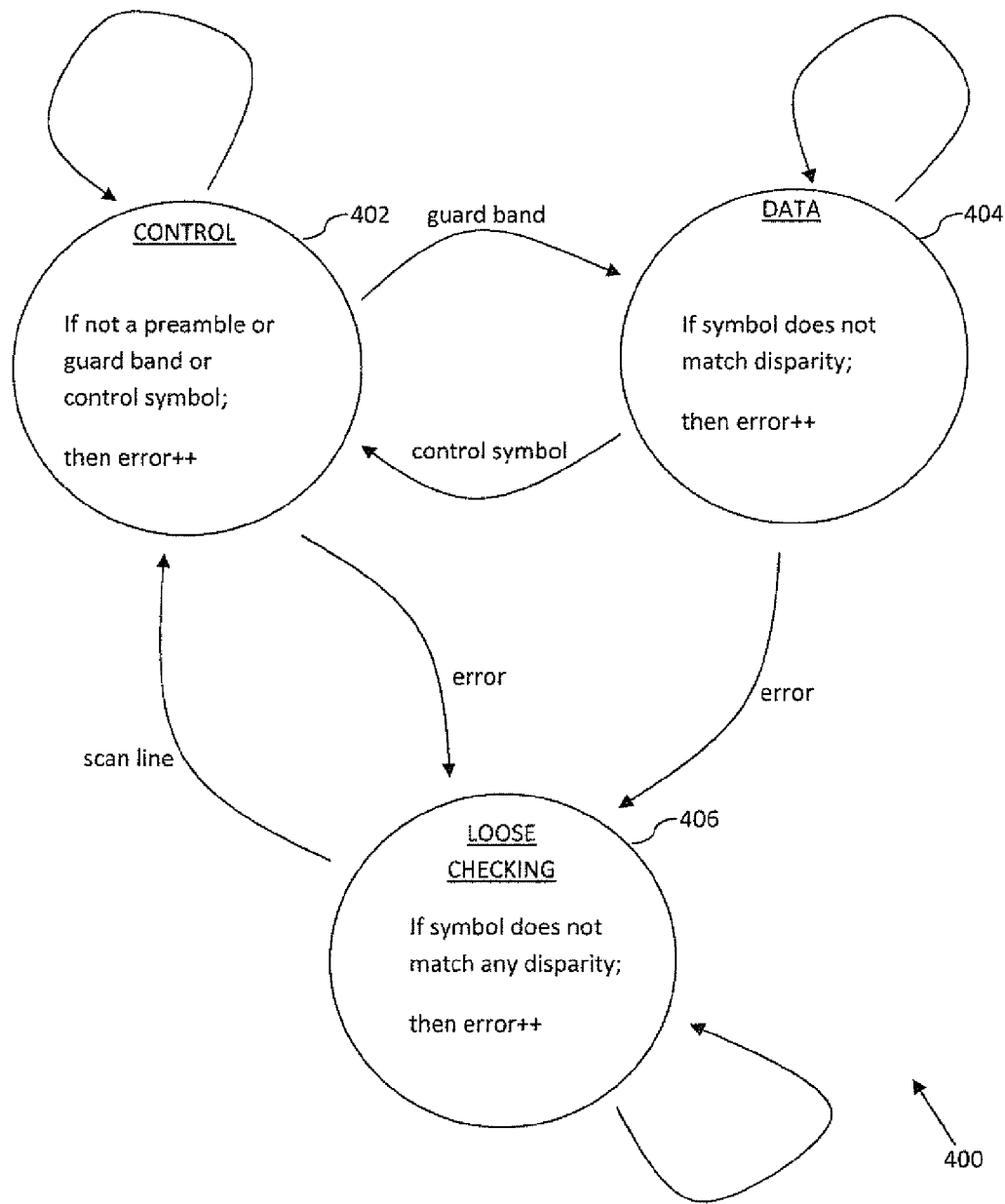
FIG. 4 is a logical flow diagram illustrating one exemplary embodiment of a logical state diagram implementing symbol error estimation, according to the present disclosure.

Accordingly, in one exemplary embodiment, a High-Definition Multimedia Interface (HDMI) TDMS receiver counts the number of invalid symbols received during one or more operational modes (e.g., vertical blanking periods, horizontal blanking periods, and video data periods). FIG. 4 illustrates a representation of a simplified logical state diagram implementing an exemplary symbol error estimation with two (2) main states: "control period" 402 and "data period" 404, and one optional state "loose checking" 406.

It will be appreciated that more complex schemes than those set forth above can be implemented consistent with the present disclosure if desired; however, the improvements in accuracy have been found by the inventor hereof to be significantly diminished. For example, the encodings used for control symbols and preambles come from a small set of common symbols; thus, control symbols and preambles can be grouped together without significant impact. Similarly, the guard band is only transmitted for a very short period of time (two symbols), so explicit checking of guard band symbols is unlikely to significantly impact the symbol error count. Similarly data island data occurs relatively rarely. Moreover, distinguishing between data island data and video data requires detection of a preamble across all three lanes (data islands are only on a single lane, video data is provided on all three). Thus, in one exemplary embodiment of the disclosure, data island data is treated as video data. However, in other embodiments where data islands are treated separately from video data, then finer granularity can be used. Data island guard band symbols are not in the same subset of video data symbols as data island data symbols; consequently, the receiver can check for data island guard band symbols as well as the TERC4 (TMDS Error Reduction Coding 4-bit) symbol checks.

Referring back to FIG. 4, during the control period 402, the state machine increments the symbol error count by one (1) each time a symbol is received that is not a preamble symbol, a guard band symbol, or a control symbol. Responsive to detecting a guard band, the state machine transitions to the data period state 404.

During the data period state 404, the state machine verifies that received symbols correspond to the current running disparity. Video data symbols (but not the symbols used for data island data) have both zero and non-zero disparity symbols (the difference in the number of zeros and ones). To ensure that over time the running disparity (the excess of ones over zeros or vice versa over a sequence of symbols) remains bounded, exemplary video data uses different encodings for the same value.

Specifically, the current disparity value (referred to as Cnt( )) after transmission of any symbol ranges from −10 to +10 (Cnt( ) is always even). There are three groupings of 256 10-bit symbols corresponding to a negative, zero and positive running disparity. Thus, any 8-bit value maps to the 10-bit symbol corresponding to the current running disparity (negative, zero, positive).

Accordingly, the received 10-bit symbols are validated against the current running disparity. Specifically, a 10-bit symbol that is received and does not match the current running disparity, is assumed to indicate a bit error. As previously noted, numerical analysis indicates that only three (3) in four (4) symbol errors will be caught in this manner. Thus, the overall estimated symbol error count is 133% the value calculated.

Finally, if a control symbol is detected, the state machine transitions to the control period state 402.

In one useful variant, the state machine 400 additionally includes a "loose checking" state 406 that is entered when an invalid symbol is detected. During loose checking operation, the received symbols are checked against the pool of all valid symbols for all disparities. Loose checking ensures that a disparity mismatch between the transmitter and receiver does not trigger excessive error counts. Specifically, the loose checking flag improves accuracy by compensating for valid-valid errors (valid-valid errors do not generate an invalid symbol). Valid-valid errors cannot be detected, however they result in an incorrect disparity value. When Cnt( )transitions into an improper band (e.g., from negative to zero, etc.), then correct symbols will be validated against the wrong table, resulting in a false error detection. The first false error detection represents the actual missed symbol; however, subsequent false detections would unnecessarily inflate the error count. The loose checking flag ensures that only the first incidence is counted in the symbol error count.

During loose checking operation, the likelihood of detecting invalid symbol errors is significantly less. Consequently, the loose checking flag is reset at every scan line. Since symbol errors are relatively sparse, the impact on the accuracy of the technique is negligible.

Apparatus—

Figure 5:
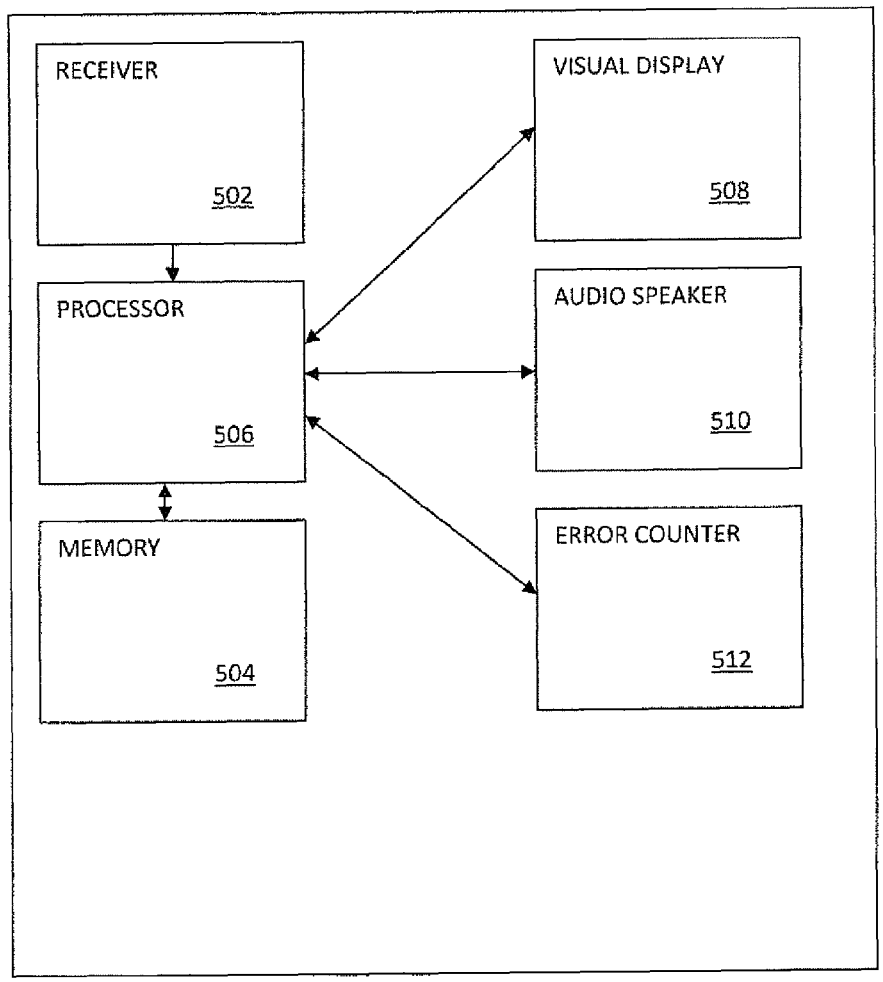
FIG. 5 is a logical block diagram representing an exemplary user device apparatus configured to estimate symbol error rate.

Referring now to FIG. 5, an exemplary apparatus 500 configured to estimate symbol error rate (SER) is illustrated. In one embodiment, the apparatus comprises a user device (e.g., personal computers (PCs), such as for example an iMac™, Mac Pro™, Mac Mini™, MacBook™, MacBook Pro™, MacBook Air™, or minicomputers, whether desktop, laptop, or otherwise, or a mobile devices such as handheld computers, PDAs, video cameras, set-top boxes, personal media devices (PMDs), display device (e.g., those compliant with the aforementioned High-Definition Multimedia Interface (HDMI) standard(s)), or any combinations of the foregoing). While a specific device configuration and layout is shown and discussed, it is recognized that many other configurations may be readily implemented by one of ordinary skill given the present disclosure, the apparatus 500 of FIG. 5 being merely illustrative of the broader principles of the disclosure.

The illustrated apparatus 500 of FIG. 5 includes an upstream plurality of ports and corresponding receiving elements (e.g., receiver or transceiver network interfaces) 502. As used herein, the terms "network interface" or "interface" typically refer to any signal, data, or software interface with a component, network or process including, without limitation, those of the HDMI, Digital Visual Interface (DVI), Mobile High-Definition Link (MHL), FireWire (e.g., FW400, FW800, etc.), USB (e.g., USB2, USB 2.0, USB 3.0, wireless USB), DisplayPort, Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi ™ (e.g., 802.11a, b, g, n, or any draft standards relating thereto), WiMAX (802.16), PAN (802.15), IrDA or other wireless families, including Bluetooth.

The upstream plurality of ports and associated receiving elements 502 may comprise one or more upstream channels, and receiver apparatus (e.g., multiplexing switches, reception logic, clock recovery circuitry, etc.). The receiver apparatus monitors and selectively enables and disables the one or more upstream channels. In certain embodiments, the receiver apparatus may be adapted to utilize a Transition Minimized Differential Signaling (TDMS) protocol, such as that associated with the exemplary HDMI protocol previously described herein.

The processing subsystem 506 may comprise one or more of central processing units (CPU) or digital processors, such as a microprocessor, digital signal processor, field-programmable gate array, RISC core, or plurality of processing components mounted on one or more substrates. The processing subsystem is coupled to operational memory 504, which may include for example SRAM, FLASH and SDRAM components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown processing subsystem 506 includes discrete components, however it is understood that in some embodiments they may be consolidated or fashioned in a SoC (system-on-chip) configuration.

The processing subsystem 506 is adapted to receive one or more media streams from an upstream apparatus 502 for processing for media displays such as a video display 508, or audio speakers 510. Processing subsystem 506 may preferentially comprise graphics processors, applications processors, and or audio processors. In "thin clients", the processing subsystem 506 may be significantly reduced in complexity and limited to simple logic, or in extreme cases altogether non-existent.

During operation, the processing subsystem identifies one or more invalid symbols (or alternately valid symbols). In one exemplary embodiment, the processor maintains a "lookup" table with symbol validity. For a 10-bit symbol, the array constitutes a 1024 element array, each element indicating a valid or invalid pattern (e.g., one indicates valid, zero indicates invalid); each received 10-bit symbol is compared to the array value at the corresponding index to determine validity. Within the context of HDMI, one such array can be used to check valid symbols received during control periods, and three such arrays can represent video data disparity operation (e.g., positive, zero and negative). In some embodiments, valid or invalid symbols can be performed as an explicit check, for example, guard band and preamble symbols can be explicitly checked (there are only two possible 10-bit values).

As shown, the apparatus further comprises an error counting memory element 512. In one variant, separate error counters are maintained for each of the one or more upstream channels. During operation, the error counter is incremented whenever an error is detected; physical constraints may limit the maximum number of errors that can be counted, e.g., a 15 bit counter may only be able to store up to 32,767 errors. In one such implementation, the error counter is 15 bits long, and mapped into two bytes of I2C accessible data, the lower addressed byte contains the least significant 8 bits of the error counter, and the higher addressed byte contains the most significant 7 bits of the error counter. The 16th bit of the error checking counter can be used to indicate that the counter is active (e.g., an "active" flag).

Error checking starts as soon as the receiver has achieved symbol lock with the incoming data stream on the appropriate lane. The active flag is set as soon as error checking starts, and is not cleared until the receiver is disconnected from the display Source or placed into a low power mode. In particular, if the receiver looses sync with the incoming signal, then the active bit remains set and the error counter is not cleared.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the principles disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the principles described herein. The foregoing description is of the best mode presently contemplated of carrying out the described principles. This description is in no way meant to be limiting, but rather should be taken as illustrative of the general principles described herein. The scope of the disclosure should be determined with reference to the claims.

What is claimed is:

1. A method for estimating received error rates, comprising:
   identifying a set of invalid symbols based on a first operational mode and a second operational mode;
   determining a likelihood of detecting an invalid symbol in the first operational mode;
   detecting one or more received invalid symbols in the first operational mode; and
   estimating a number of symbol errors in the second operational mode, based at least in part on the detected one or more received invalid symbols and the determined likelihood in the first operational mode.

2. The method of claim 1, wherein the received invalid symbol is detected based at least in part on a listing of valid symbols corresponding to a predetermined protocol format.

3. The method of claim 1, wherein the received invalid symbol is detected based at least in part on a comparison of the received symbol against one or more lists of valid symbols.

4. The method of claim 3, wherein the first operational mode is associated with a respective list of valid symbols.

5. The method of claim 1, further comprising counting a number of the detected one or more received invalid symbols;
   wherein the estimated number of symbol errors is further based at least in part on the counted number of detected one or more received invalid symbols.

6. The method of claim 1, further comprising counting a number of received valid symbols;
   wherein the estimated number of symbol errors is further based at least in part on the counted number of received valid symbols.

7. The method of claim 1, wherein the estimating received error rates is conducted relative to a high-speed bus interface.

8. An apparatus for estimating a rate of symbol errors, the apparatus comprising:
   one or more interfaces, the one or more interfaces configured to receive data communication from an upstream device; and
   at least one controller in operative communication with the one or more interfaces, the at least one controller configured to:
     detect one or more valid-invalid error symbols received over the one or more interfaces;
     determine a probability of an occurrence of one or more valid-valid error symbols; and
     estimate a number of symbol errors based at least on the detected one or more valid-invalid error symbols and the determined probability.

9. The apparatus of claim 8, wherein the at least one controller is further configured to track the estimated number.

10. The apparatus of claim 9, wherein the at least one controller is further configured to:
   detect when the upstream device in communication from the one or more interfaces has a change in operational status; and
   upon the detection, reset the tracked number to an initial counter value.

11. The apparatus of claim 10, wherein the detected change in operational status comprises a disconnection of the upstream device from the one or more interfaces.

12. The apparatus of claim 10, wherein the detected change in operational status comprises the entrance of the upstream device into a low power mode.

13. The apparatus of claim 8, wherein the at least one controller is further configured to track a number of valid symbols received over the one or more interfaces.

14. The apparatus of claim 8, wherein invalid valid-invalid error symbols are detected based at least in part on a lack of compliance with a data format.

15. The apparatus of claim 8, wherein at least one of the one or more interfaces are compliant with a High-Definition Multimedia Interface (HDMI) standard.

16. A method of accounting for undesired errors over a data interface, the method comprising:
   receiving one or more symbols during an operational mode selected from a plurality of operational modes;
   determining an invalidity of the received one or more symbols based at least in part on a set of rules associated with the selected operational mode, where the set of rules are further configured to limit types of symbols which can be used with the selected operational mode;
   determining a likelihood of detecting an invalid symbol in a different operational mode; and
   tracking an estimated number of total invalid symbols of the one or more symbols based at least in part on the determined invalid one or more symbols and the determined likelihood.

17. The method of claim 16, wherein the determining when the received one or more symbols are invalid is further based at least in part on verifying the received one or more symbols correspond to a current running disparity.

18. The method of claim 17, wherein a symbol of the received one or more symbols is determined to be invalid when the symbol has a disparity mismatch with the current running disparity.

19. The method of claim 17, further comprising:
   upon determining a symbol of the one or more symbols has a disparity mismatch with the current running disparity;
   checking the symbol against a pool of all valid symbols for all disparities; and
   determining the symbol to be invalid when the symbol fails to match any of the valid symbols.

20. The method of claim 16, further comprising instituting a corrective action upon the estimated number of invalid symbols exceeding an error threshold.

21. The method of claim 20, wherein the corrective action comprises at least indicating a transmission problem to a source device transmitting the one or more symbols.

22. A method for estimating received error rates, comprising:
   identifying a set of invalid symbols based on one or more operational modes;
   determining a likelihood of detecting an invalid symbol;
   detecting one or more received invalid symbols; and
   estimating a number of symbol errors, based at least in part on the detected one or more received invalid symbols and the determined likelihood;
   where the estimating received error rates is conducted relative to a high-speed bus interface.

23. An apparatus for estimating a rate of symbol errors, the apparatus comprising:
   one or more interfaces, the one or more interfaces configured to receive data communication from an upstream device;
   where at least one of the one or more interfaces are compliant with a High-Definition Multimedia Interface (HDMI) standard; and
   at least one controller in operative communication with the one or more interfaces, the at least one controller configured to:
      detect one or more invalid symbols received over the one or more interfaces;
      determine a probability of an occurrence of one or more undetectable invalid symbols; and
      estimate a number of symbol errors based at least on the detected one or more invalid symbols and the determined probability.

* * * * *